US011399344B2

(12) United States Patent
Kumar

(10) Patent No.: US 11,399,344 B2
(45) Date of Patent: Jul. 26, 2022

(54) SYSTEM AND METHOD FOR SOC IDLE POWER STATE CONTROL BASED ON I/O OPERATION CHARACTERIZATION

(71) Applicant: Apple Inc., Cupertino, CA (US)

(72) Inventor: Derek R. Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 15/003,551

(22) Filed: Jan. 21, 2016

(65) Prior Publication Data

US 2016/0219525 A1 Jul. 28, 2016

Related U.S. Application Data

(60) Provisional application No. 62/108,033, filed on Jan. 26, 2015.

(51) Int. Cl.
*G06F 1/3221* (2019.01)
*H04W 52/02* (2009.01)
*G06F 1/3234* (2019.01)

(52) U.S. Cl.
CPC ...... *H04W 52/0254* (2013.01); *G06F 1/3221* (2013.01); *G06F 1/3243* (2013.01);
(Continued)

(58) Field of Classification Search
CPC .... G06F 1/3287; G06F 1/3206; G06F 3/0619; G06F 1/3296; G06F 1/3275;
(Continued)

(56) References Cited

U.S. PATENT DOCUMENTS 6,986,064 B2    1/2006 Yoshimoto et al.
7,774,631 B1 *  8/2010 Walton ................. G06F 1/3221
                                              713/321
(Continued)

FOREIGN PATENT DOCUMENTS

JP    2001-331243 A    11/2001
JP    2013-250791 A    12/2013
(Continued)

OTHER PUBLICATIONS

PCT International Search Report And Written Opinion for PCT International Appln No. PCT/US2016/014628 dated Aug. 1, 2016. (24 pages).

(Continued)

*Primary Examiner* — Jaweed A Abbaszadeh
*Assistant Examiner* — Brian J Corcoran
(74) *Attorney, Agent, or Firm* — Womble Bond Dickinson (US) LLP

(57) ABSTRACT

A method and apparatus of a device that manages system performance by controlling power state based on information related to I/O operations is described. The device collects historical I/O information. The historical I/O information may include the number of I/O operations over a sample period of time and the inter-arrival time between I/O operations. The device further receives information related to a current I/O operation. The information of the current I/O operation may include direction, size, quality of service, and media type of the I/O operation. The device determines a power state based on the historical I/O information and the information relative to the current I/O operation to reduce power consumption while improving system efficiency and maintaining an acceptable level of system performance. The device further applies the determined power state. Other embodiments are also described and claimed.

20 Claims, 9 Drawing Sheets

(52) U.S. Cl.
CPC ......... *H04W 52/0258* (2013.01); *Y02D 10/00* (2018.01); *Y02D 30/70* (2020.08)

(58) Field of Classification Search
CPC .... G06F 1/3221; G06F 1/3225; G06F 1/3243; Y02B 60/1217; Y02B 60/1285; Y02B 60/46; Y02B 70/3216; H04W 52/0258; H04W 52/0254; Y02D 10/00; Y02D 30/70
See application file for complete search history.

(56) References Cited

U.S. PATENT DOCUMENTS

| | | | |
|---|---|---|---|
| 8,402,293 B2 | 3/2013 | Morgan et al. | |
| 8,417,979 B2 | 4/2013 | Maroney | |
| 8,516,285 B2 | 8/2013 | Jahagirdar et al. | |
| 8,560,749 B2 | 10/2013 | Wang et al. | |
| 8,635,469 B2 | 1/2014 | Wang et al. | |
| 8,670,205 B1* | 3/2014 | Malina | G06F 3/0625 360/69 |
| 9,329,664 B2 | 5/2016 | Bose et al. | |
| 9,690,353 B2 | 6/2017 | Moran et al. | |
| 2001/0044907 A1 | 11/2001 | Yoshimoto et al. | |
| 2004/0203797 A1 | 10/2004 | Burr | |
| 2005/0240786 A1* | 10/2005 | Ranganathan | G06F 1/3215 713/320 |
| 2006/0209592 A1* | 9/2006 | Li | G11C 11/5642 365/185.03 |
| 2008/0235364 A1* | 9/2008 | Gorbatov | G06F 1/324 709/224 |
| 2009/0235105 A1 | 9/2009 | Branover et al. | |
| 2010/0050008 A1* | 2/2010 | Allalouf | G06F 1/32 713/340 |
| 2011/0078478 A1 | 3/2011 | Branover et al. | |
| 2012/0054519 A1* | 3/2012 | Branover | G06F 1/324 713/322 |
| 2012/0154870 A1* | 6/2012 | Ogushi | G06K 15/402 358/1.16 |
| 2012/0210104 A1 | 8/2012 | Danko | |
| 2013/0007488 A1* | 1/2013 | Jo | G06F 3/0625 713/320 |
| 2013/0326252 A1 | 12/2013 | Ise et al. | |
| 2014/0181555 A1* | 6/2014 | Bodas | G06F 9/4812 713/323 |
| 2014/0195734 A1* | 7/2014 | Ha | G06F 1/3237 711/114 |
| 2016/0077576 A1* | 3/2016 | Karhu | G06F 1/3246 713/323 |

FOREIGN PATENT DOCUMENTS

| | | |
|---|---|---|
| TW | I439849 B | 6/2014 |
| WO | WO2008003009 A1 | 1/2008 |

OTHER PUBLICATIONS

You Daecheol et al: "Dynamic Power Management For Embedded Processors In System-On-Chip Designs", Electronic Letters, IEE Stevenage, GB, vol. 50, No. 18, Aug. 28, 2014, pp. 1309-1310, XP006049236, ISSN: 0013-5194, DOI: 10.1049.EL.2014.1374.

Daniel Lezcano: "IO latency tracking/Linaro Power Mangement Team", Linux Plumber Conference, Engery-aware Scheduling and CPU Power Management track, Oct. 17, 2014 (Oct. 17, 2014), pp. 1-6, XP055286101, http://www.linuxplumbersconf.net/2014/ocw//system/presentations/2397/original/IP latencyPredictiomLPC.pdf.

Lu, Yung-Hsiang et al., "Power-Aware Operating Systems for Interactive Systems", IEEE Transactions on Very Large Scale Integration (VLSI) Systems, vol. 10, No. 2, Apr. 2002, pp. 119-134.

PCT International Preliminary Report on Patentability for PCT/US2016/014628 dated Aug. 1, 2017, 15 pages.

* cited by examiner

SYSTEM AND METHOD FOR SOC IDLE POWER STATE CONTROL BASED ON I/O OPERATION CHARACTERIZATION

RELATED MATTERS

This application claims the benefit of the earlier filing date of provisional application No. 62/108,033, filed Jan. 26, 2015, entitled "System and Method for SoC Idle Power State Control Based on I/O Operation Characterization".

FIELD OF THE DISCLOSURE

This disclosure relates generally to operating systems and more particularly to devices for performance management.

BACKGROUND OF THE DISCLOSURE

An operating system is a collection of software that manages device hardware resources and provides common services for computer programs. The operating system is a vital component of the system software in a device. The system software manages and integrates a device's capabilities. The system software includes the operating system, utility software, device drivers, and other software tools. The operating system manages the power consumption and performance of the device.

Power Management for a device power gates a processor to a low-power state when the processor is inactive. The low-power state can be an idle state for the processor. Modern processors within computer systems often adopt aggressive power management techniques in order to reduce overall energy consumption, reduce cooling requirements, and prolong battery life for portable and embedded systems. As a result, the processors enter into low-power states more frequently and dwell in such low-power states for longer periods of time. Transitions to these low power states typically involves additional latency, with frequent transitions to/from such states reducing net efficiency gains. The processor may support multiple types of idle power states, with each involving differing transition latencies, transition energies, and achievable power levels.

Input/output (I/O) is the communication between a computer and the outside world. Inputs are the signals or data received by the computer and outputs are the signals or data sent from it. Any transfer of information to or from the CPU or memory of a computer, for example by reading data from a disk drive, is considered I/O.

SUMMARY

A method and apparatus of a device that manages system performance by controlling power state based on I/O information is described. In one embodiment, the I/O information is the current and historical information related to I/O operations. In one embodiment, the current I/O information includes the direction (e.g., read or write) of the current I/O operation. In one embodiment, the current I/O information includes the size (e.g., the amount of data involved) of the current I/O operation. In one embodiment, the current I/O information includes the quality of service of the current I/O operation. In one embodiment, the current I/O information includes the media type (e.g., solid state drive or hard drive) of the current I/O operation. The historical I/O information of one embodiment includes the number of I/O operations over a sample period of time. In one embodiment, the historical I/O information includes the inter-arrival time between I/O operations over a sample period of time. In one embodiment, the historical I/O information includes the aggregated size of read operations over a sample period of time and the aggregated size of write operations over the same sample period of time.

In an exemplary embodiment, the device collects historical I/O information. The device further receives current I/O information of an I/O operation to be performed by the device. The device determines a power state based on the historical I/O information and the current I/O information to reduce power consumption while improving system efficiency and maintaining an acceptable level of system performance. The device further applies the determined power state. In one embodiment, the power state is applied to the entire device. In another embodiment, the power state is applied to a processor of the device. In yet another embodiment, the power state is applied to a system on chip (SoC) of the device.

Other methods and apparatuses are also described. Machine-readable non-transitory media are also described and they include executable computer program instructions which when executed by a data processing system cause the data processing system to perform one or more methods described herein.

BRIEF DESCRIPTION OF THE DRAWINGS

The present disclosure is illustrated by way of example and not limitation in the figures of the accompanying drawings in which like references indicate similar elements.

DETAILED DESCRIPTION

Figure 1:
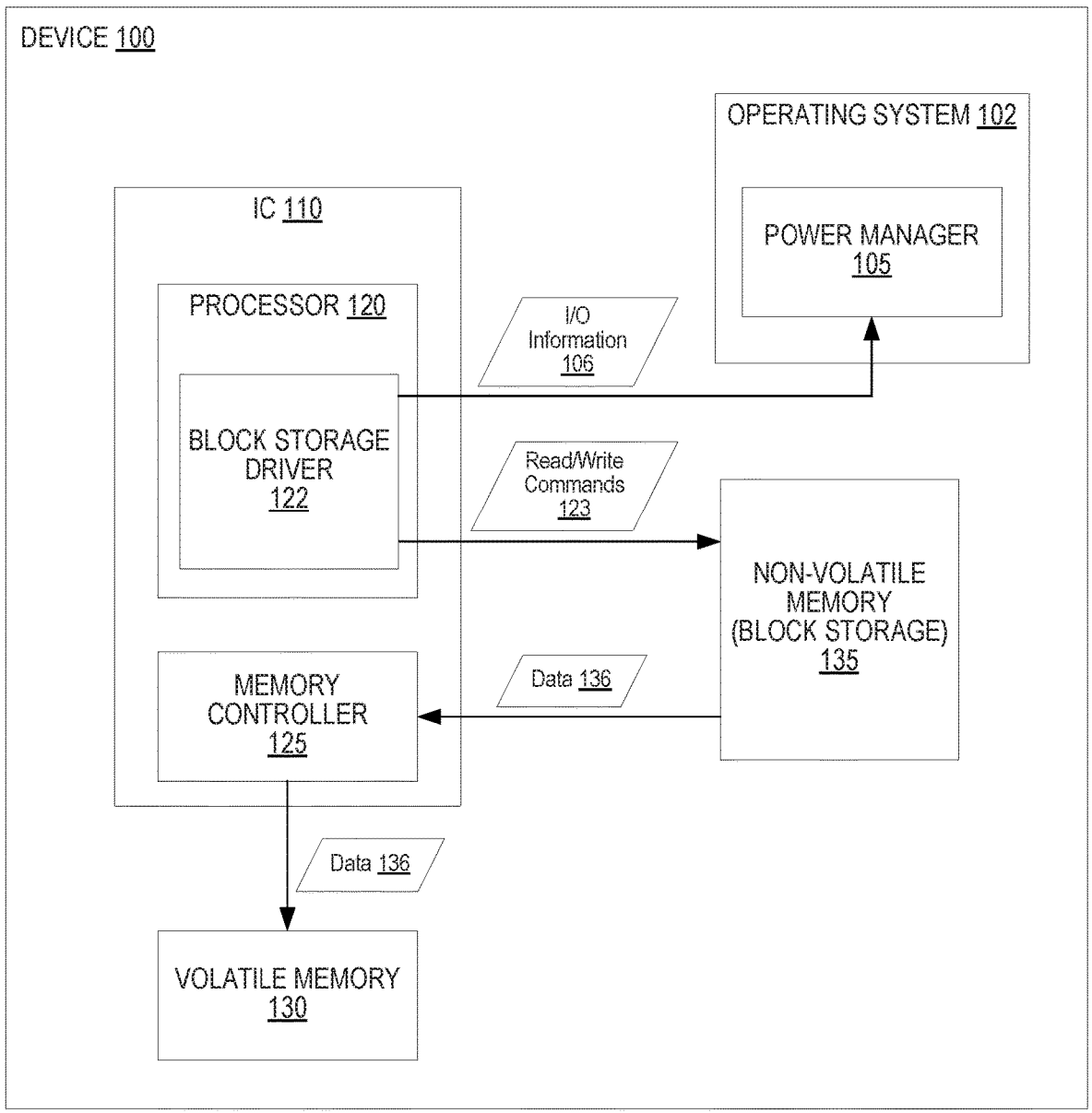
FIG. 1 is a block diagram of one embodiment of a device that manages system performance by controlling power state based on I/O information.

A method and apparatus of a device that manages system performance by controlling power state based on I/O information is described. In the following description, numerous specific details are set forth to provide thorough explanation of embodiments of the present disclosure. It will be apparent, however, to one skilled in the art, that embodiments of the present disclosure may be practiced without these specific details. In other instances, well-known components, structures, and techniques have not been shown in detail in order not to obscure the understanding of this description.

Reference in the Specification to "one embodiment" or "an embodiment" means that a particular feature, structure, or characteristic described in connection with the embodiment can be included in at least one embodiment of the disclosure. The appearances of the phrase "in one embodiment" in various places in the Specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

At times, after a processor performs an I/O operation (e.g., issuing a read/write command to a NAND storage device), the processor and/or system on a chip (SoC), in the absence of other pending work, can enter a low power state. In one embodiment, this low-power state is an idle state. In this embodiment, a power management module causes the processor, associated caches and memory controllers, and random access memory (RAM) to enter low power states. Depending on the power state selected, processor caches may be evicted, and RAM may enter self-refresh. Not long after that, the NAND storage device completes the I/O request, and the memory controller and the RAM are reactivated in order to access the data. An interrupt is generated to notify the processor of the completion of the I/O and restore the processor and associated components from the low-power state to a full-power state so that the processor can operate on the data returned by the I/O operation.

Because it takes time to drag the processor and related components out of the low-power state after the I/O request is completed, there is latency in receiving the data from the I/O subsystem. Therefore, it will take an increased amount of time for the I/O operation to complete. That might be unacceptable because the user is waiting for the data to be dragged into RAM, possibly during an application launch or when the device is paging in memory stored on the storage device. So there is negative impact to the performance of the computer system by frequently having the processor and related components entering into the low-power state after issuing I/O requests.

Furthermore, by having the processor and related components entering into the low-power state, just to have them immediately back to a normal power state, a significant amount of energy is wasted to perform the transitions between different power states, including power gating the processor and related components down to enter into the low-power state and then immediately reactivating those components to exit the lower power state. So there is also negative impact to the efficiency of the computer system.

A method and apparatus of a device that manages system performance in order to reduce power consumption of the device while improving system efficiency and maintaining a reasonable level of system performance is described. In one embodiment, after a processor issues an I/O request to a non-volatile storage device, the processor enters into a low-power state under which power to the processor and related components are power gated to reduce power consumption of the device. The non-volatile storage device completes the I/O transaction and notifies the processor to further process the data involved in the I/O transaction. The processor and related components are reactivated to process the data. This introduces latency in receiving the data from the I/O subsystem and adds unnecessary energy cost of entering and exiting the low-power state. Latency is the amount of time it takes to go from a low-power state to a higher power state in which the processor can perform certain intended functions. In one embodiment, the device determines a power state based on the historical I/O information and the current I/O information to reduce power consumption while improving system efficiency and maintaining an acceptable level of system performance. The device then enters into the determined power state. In one embodiment, the device applies the determined power state when the I/O operation is in flight. In another embodiment, the device applies the determined power state when the I/O operation is in flight and after receiving the result of the I/O operation.

FIG. 1 is a block diagram of one embodiment of a device 100 that manages system performance by controlling power state based on I/O information. In one embodiment, the device 100 can be a desktop computer, server, smartphone, laptop, personal digital assistant, music playing device, gaming device, or any other device that can execute multiple processes. In FIG. 1, device 100 includes an integrated circuit 110, an operating system 102, a volatile memory 130, and a non-volatile memory 135. In one embodiment, the device 100 can include multiple processors, and/or multiple processing cores.

The integrated circuit 110 includes a processor 120 and a memory controller 125. In one embodiment, the integrated circuit 110 can be a system on chip (SoC). The processor 120 is a multipurpose, programmable device that accepts digital data as input, processes the data according to instructions stored in its memory, and provides results as output. The processor 120 includes a block storage driver 122 that controls the block storage devices (e.g., non-volatile memory 135) that are attached to the processor 120. The memory controller 125 manages the flow of data going to and from the volatile memory 130.

The operating system 102 is a set of software used to manage device hardware resources and provides common services for other running computer programs, such as application programs. The operating system 102 includes a power manager 105 that manages power consumption of the device 100. The power manager 105 can determine a power state for the entire device 100, or power states for individual components of the device. In one embodiment, the power manager 105 applies a power state to the integrated circuit 110. In another embodiment, the power manager 105 applies a power state to the processor 120.

A power state defines a power consumption level of a device, or one or more components of the device. For example and in one embodiment, a power state can be a full-power state (i.e., the highest power state) or a power-off state (i.e., the lowest power state). Under the full-power state, the device or the group of components of the device are fully powered on, with no individual components set in a power saving mode. Under the power-off state, the device or components are turned off. In another embodiment, there can be several low-power states, which define different power consumption levels that are between the full-power state and the power-off state. For a device or a group of components, the more components are in the power saving mode, the lower the power state is.

For components that are in power saving mode, different power reduction techniques can define different power states. For example, power gating is a power reduction technique that shuts off the current to blocks of the circuit to reduce power consumption. Clock gating is a power reduction technique that saves power by disabling clock pulses to portions of a circuit so that the transistors in those portions of the circuit do not switch states. Even though the power consumption for switching states is avoided, leakage currents are still incurred in clock gating. Therefore, power gating saves more power than clock gating, and components that are power gated are in a lower power states than components that are clock gated. However, power-gating may not retain state, such as the contents of processor caches, which may need to be reconstructed on power-gate exit.

The non-volatile memory 135 is a block storage device that persistently stores information, such as a hard disk or a NAND stack. The volatile memory 130 is computer memory that requires power to maintain the stored information, such as dynamic random-access memory (DRAM).

In one embodiment, the block storage driver 122 issues read/write commands 123 (by issuing I/O requests) to access data on the non-volatile memory 135. In the cases of read commands, the non-volatile memory 135 sends the requested data 136 to the memory controller 125, which passes the data 136 to the volatile memory 130 for further processing.

In one embodiment, while sending the read/write commands 123, the block storage driver 122 also sends I/O information related to the current I/O request to the power manager 105. In one embodiment, the power manager 105 determines a low-power state based on the current I/O information 106 and stored historical I/O information (not shown) in order to reduce power consumption while improving efficiency and maintaining an acceptable level of system performance. For example and in one embodiment, instead of dropping the processor 120 and its related components to a very low-power state under which the processor 120 is power gated (e.g., a power-off state), the power manager 105 determines, based on the current I/O information 106 and historical I/O information (not shown), a low-power state under which the processor is clock gated, thus having a higher level of power consumption. By determining a higher power state and applying the higher power state to the processor 120, the latency and negative efficiency impact caused by entering into the very low power state and then quickly exiting it during certain I/O operations can be avoided.

In one embodiment, the current I/O information 106 may include direction, size, quality of service (QoS), and media type of the current I/O operation. In one embodiment, the power manager 105 applies the determined power state to the entire device 100. In another embodiment, the power manager 105 applies the determined power state to the integrated circuit 110. In yet another embodiment, the power manager 105 applies the determined power state to the processor 120 and a few related components, such as memory controller 125 and volatile memory 130.

In one embodiment, the integrated circuit 110 includes multiple processors, and/or multiple processing cores. In that embodiment, the power manager 105 controls the idle power state of the entire integrated circuit 110 by applying the determined power state to the integrated circuit 110. The integrated circuit 110 is constrained on the idle state it can achieve, even if one core is active. For example and in one embodiment, the power manager 105 controls the idle power state of the core receiving completion interrupts from the I/O subsystem by applying the determined power state to that core. In one embodiment, the completion interrupts from the I/O subsystem are restricted to be receivable by a designated core to avoid complexity in implementation.

Figure 2:
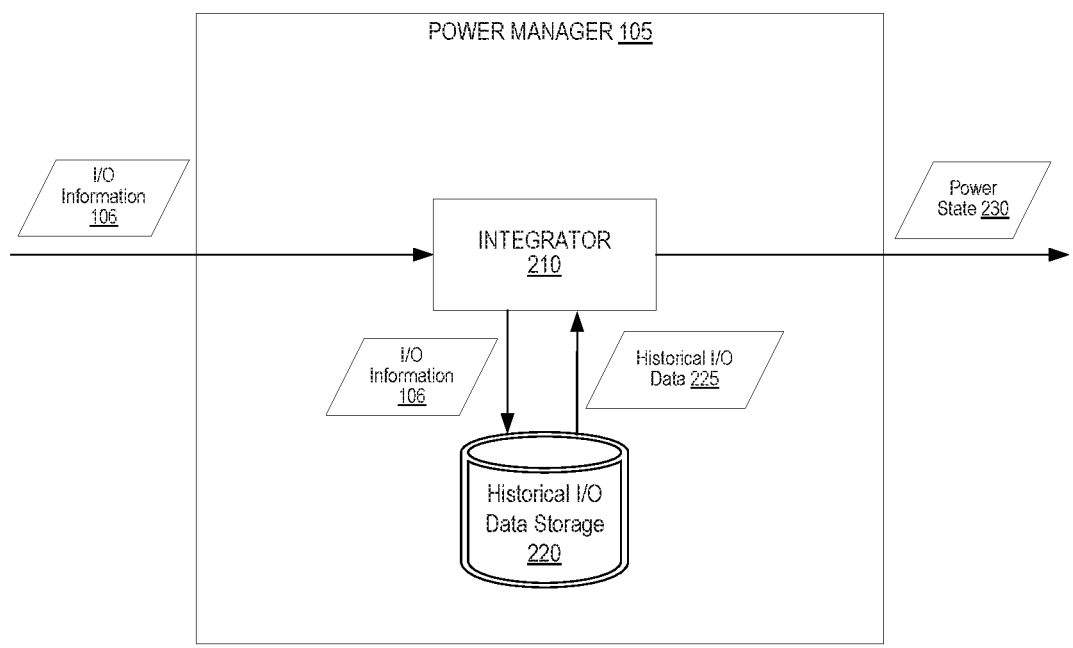
FIG. 2 illustrates a detailed block diagram of one embodiment of a power manager.

FIG. 2 illustrates a detailed block diagram of one embodiment of a power manager 105. In one embodiment, the power manger 105 is part of an operating system, as described in relation to FIG. 1 above. In another embodiment, the power manager 105 is a separate hardware/software module that manages power consumption of a device. In FIG. 2, the power manager 105 includes an integrator 210 and a historical data storage 220.

In one embodiment, the integrator 210 receives current I/O information 106 from a block storage driver (not shown), and stores the current I/O information 106 into the historical I/O data storage 220. In one embodiment, the current I/O information 106 may include direction, size, quality of service, and media type of the current I/O operation. The integrator 210 also receives historical I/O data 225 from the historical data storage 220. In one embodiment, the historical I/O data 225 may include the number of I/O operations over a sample period of time, the inter-arrival time between I/O operations, the aggregated size of read operations, and the aggregated size of write operations. In one embodiment, the integrator 210 determines a power state 230 based on the current I/O information 106 and the historical I/O data 225.

In one embodiment, the power state 230 outputted by the integrator 210 is a low-power state. In one embodiment, the determined power state 230 is applied to an entire device. In another embodiment, the determined power state 230 is applied to a processor and components closely associated with the processor, e.g. memory controller and DRAM.

The historical I/O data storage 220 receives current I/O information 106 and stores the current I/O information 106 as part of the historical I/O data. In one embodiment, the information for each I/O operation is stored as a separate item in the historical I/O data storage 220. In another embodiment, the information for I/O operations are aggregated and stored in the historical I/O data storage 220. The historical I/O data storage 220 provides the historical I/O data 225 to the integrator 210.

In one embodiment, the integrator 210 determines an appropriate low-power state 230 based on the current I/O information 106 and the historical I/O data 225 in order to reduce power consumption while improving efficiency and maintaining an acceptable level of system performance. For example in one embodiment, instead of dropping a processor to a very low-power state under which most circuit blocks of the processor are power gated, the integrator 210 selects, based on the current I/O information 106 and historical I/O data 225, a power state 230 under which most circuit blocks of the processor are clock gated, which incurs more energy consumption, but involves lower latency transitions. By selecting this higher power state and applying the higher power state to the processor, rather than re-initializing and reloading all state as it would be when most of the processor is power gated, the clock gated processor just receives a signal to disable the clock gating when the interrupt indicating an I/O operation has completed arrives. Consequently, the latency and negative efficiency impact caused by entering into the very low-power state and then quickly exiting it during certain I/O operations can be avoided.

For example, paging is a memory management mechanism in which a computer stores and retrieves data in same-size blocks (i.e., pages) from the secondary storage for use in main memory. During a paging storm, a lot of paging requests are issued and a large number of I/O operations are performed in a short period of time. For example and in one embodiment, a paging storm is generated when an application program is being launched. When power state control is not based on I/O information, each time an I/O request is issued during the paging storm, the processor may be dropped into a deep low-power state (e.g., a power gated state that has a very low level of power consumption and would have a high latency in order to be re-activated). Once the I/O operation is completed, it will take a long time and consume quite a bit of power in order to drag the processor out of the deep low-power state to further process the data received from the I/O subsystem. This would have a negative impact on the system performance and efficiency because the user would have to wait for a longer period of time for the application to be launched and power is wasted in frequent entering and exiting deep low-power state.

With I/O based power state control, each time an I/O request is issued during the paging storm, the power state of the processor is determined by taking into account the characteristics of the I/O operation and historical I/O data. In the scenario of a paging storm caused by an application launch, each I/O operation has a high QoS because the user is waiting for the application program to be launched. The historical I/O information related to the paging storm would indicate that the number of I/O operations is large and the inter-arrival time between I/O operations is short. Consequently, a shallow low-power state (e.g., an idle processor power state of relatively high power consumption level and very low latency) will be selected across I/O operations involved in the paging storm to save a small amount of power while improving system efficiency and maintaining a high level of system performance. The user-perceivable wait for the application to be launched would be shorter and less energy is being consumed in the transition between different power states.

The power manager 105 was described above for one embodiment of the disclosure. One of ordinary skill in the art will realize that in other embodiments this module can be implemented differently. For instance, in one embodiment described above, certain modules are implemented as software modules. However, in another embodiment, some or all of the modules might be implemented by hardware, which can be dedicated application specific hardware (e.g., an ASIC chip or component) or a general purpose chip (e.g., a microprocessor or FPGA).

Figure 3A:
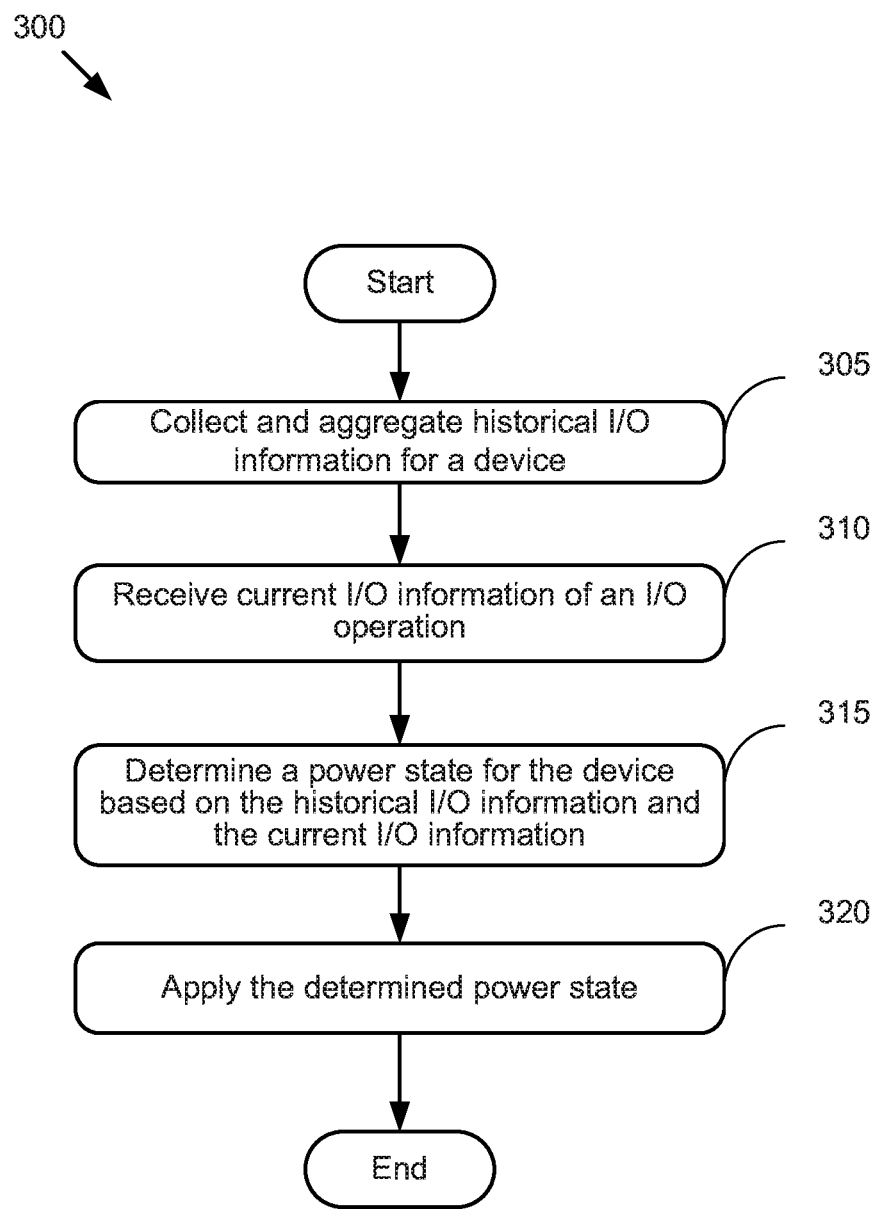
FIG. 3A illustrates a flowchart of one embodiment of a process to manage system performance by controlling power state based on I/O information.

FIG. 3A illustrates a flowchart of one embodiment of a process 300 to manage system performance by controlling power state based on I/O information. In one embodiment, the power manger 105 described in FIG. 1 and FIG. 2 above executes process 300 to determine an appropriate low-power state in order to reduce power consumption while improving system efficiency and maintaining an acceptable level of system performance. In FIG. 3A, process 300 begins by collecting and aggregating (at block 305) historical I/O information for a device. In one embodiment, the integrator 210 collects current I/O information and aggregates the current I/O information into historical I/O information, as described above in FIG. 2. In one embodiment, the historical I/O information may include the number of I/O operations over a sample period of time, the inter-arrival time between I/O operations, the aggregated size of read operations, and the aggregated size of write operations.

At block 310, process 300 receives 110 information regarding a current I/O operation. In one embodiment, the current I/O information may include direction, size, quality of service, and media type of the current I/O operation.

In one embodiment, the current I/O information is information about the I/O operation to be performed. In another embodiment, the current I/O information is predictive information. For example and in one embodiment, the operating system may notice sequential accesses to a file. The system may choose to prepare for the I/O operation but not actually issue an I/O request for the I/O operation, and set a flag to indicate that this I/O operation is predictive.

At block 315, process 300 determines a power state for the device based on the historical I/O information and the current I/O information. In one embodiment, the power state determined at block 315 is a low-power state that reduces power consumption while improving system efficiency and maintaining a reasonable level of system performance. For example and in one embodiment, instead of dropping a processor to a very low-power state under which the processor is power gated, process 300 determines, based on the current I/O information and historical I/O information, a power state under which the processor is clock gated, thus having a higher level of power consumption. By determining a higher power state and applying the higher power state to the processor, the latency and negative efficiency impact caused by entering into the very low-power state and then quickly exiting it during certain I/O operations can be avoided.

In one embodiment, when the current I/O is flagged to be predictive, the determination of the power state can be planned in longer term. For example and in one embodiment, process 300 caps the total latency for a series of I/O operations and determines the power state accordingly. In one embodiment, process 300 may reduce the aggressiveness in power management when the current I/O is flagged to be predictive.

Process 300 applies (at block 320) the determined power state. In one embodiment, the power state is applied to the entire device. In another embodiment, the power state is applied to a processor of the device and components related to the processor, such as memory controller and DRAM.

One of ordinary skill in the art will recognize that process 300 is a conceptual representation of the operations used to manage system performance. The specific operations of process 300 may not be performed in the exact order shown and described. The specific operations may not be performed in one continuous series of operations, and different specific operations may be performed in different embodiments. Furthermore, process 300 could be implemented using several sub-processes, or as part of a larger macro process.

Figure 3B:
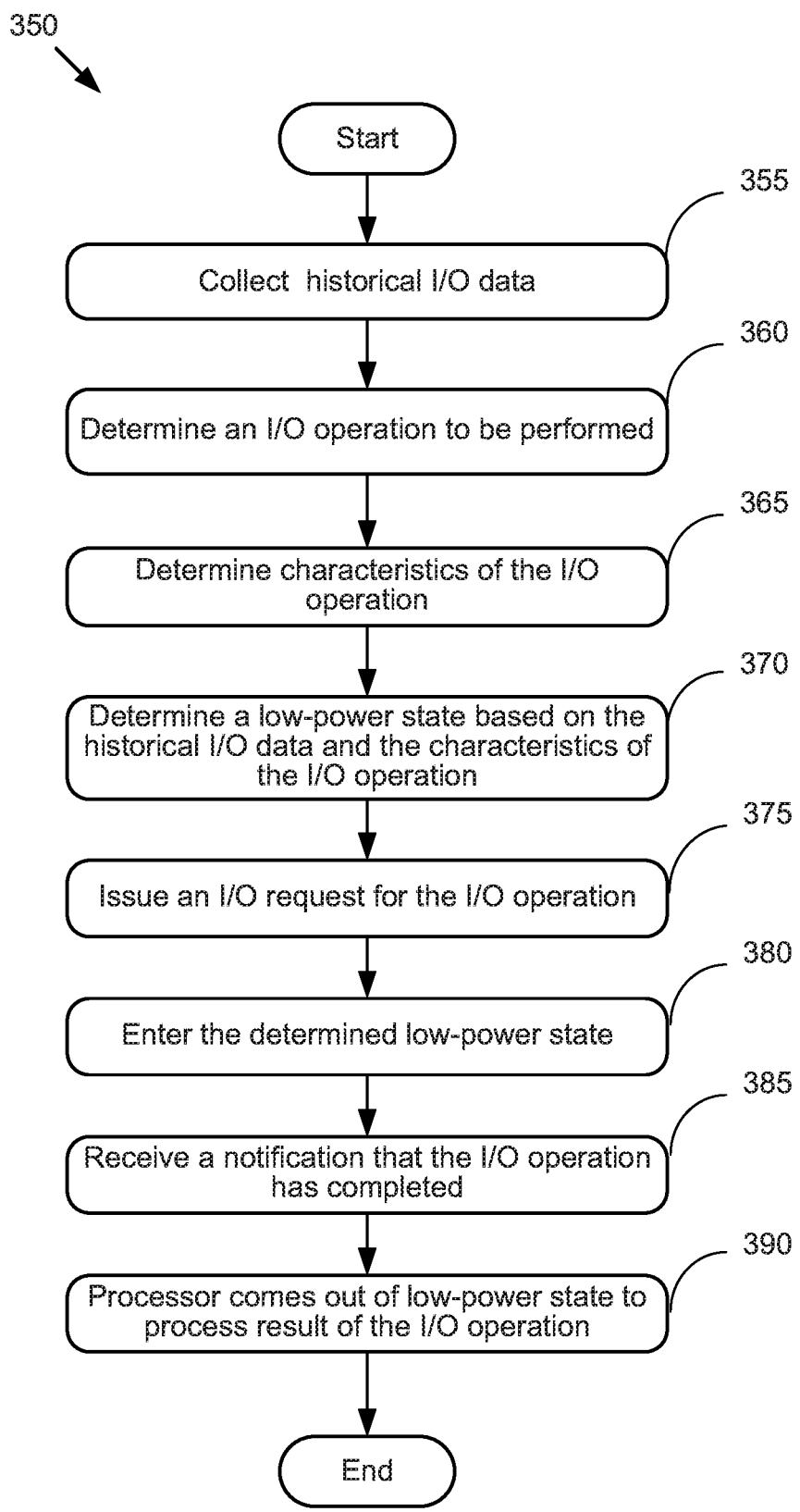
FIG. 3B illustrates a flowchart of one embodiment of another process to manage system performance by controlling power state based on I/O information.

The process of I/O based power state control is described above in FIG. 3A from the power manager's perspective. FIG. 3B illustrates a flowchart of one embodiment of another process 350 to manage system performance by controlling power state based on I/O information. FIG. 3B describes the process of I/O based power state control from the I/O operation's perspective. In one embodiment, the device 100 described in FIG. 1 above executes process 350. In FIG. 3B, process 350 begins by collecting (at block 355) historical I/O data. In one embodiment, the historical I/O data may include the number of I/O operations over a sample period of time, the inter-arrival time between I/O operations, the aggregated size of read operations, and the aggregated size of write operations.

At block 360, process 350 determines an I/O operation to be performed. In one embodiment, the I/O operation may be a read operation or a write operation. At block 365, process 350 determines characteristics of the I/O operation. In one embodiment, the characteristics of the I/O operation may include direction, size, quality of service, and media type of the I/O operation.

In one embodiment, the current I/O information is information about the I/O operation to be performed. In another embodiment, the current I/O information is predictive information. For example and in one embodiment, the operating system may notice sequential accesses to a file. The system may choose to prepare for the I/O operation but not actually issue an I/O request for the I/O operation, and set a flag to indicate that this I/O operation is predictive.

At block 370, process 350 determines a low-power state based on the historical I/O data and the characteristics of the I/O operation. In one embodiment, the low-power state determined at block 370 is a low-power state that reduces power consumption while improving system efficiency and maintaining a reasonable level of system performance. For example and in one embodiment, instead of dropping a processor to a very low-power state under which the processor is power gated, process 350 determines, based on the characteristics of the I/O operation and historical I/O data, a low-power state under which the processor is clock gated, thus having a higher level of power consumption. By determining a higher power state and applying the higher power state to the processor, the latency and negative efficiency impact caused by entering into the very low-power state and then quickly exiting it during certain I/O operations can be avoided.

In one embodiment, when the current I/O is flagged to be predictive, the determination of the low-power state can be planned in longer term. For example and in one embodiment, process 350 caps the total latency for a series of I/O operations and determines the power state accordingly. In one embodiment, process 350 may reduce the aggressiveness in power management when the current I/O operation is flagged to be predictive. For example and in one embodiment, a less aggressive power management is implemented by using a clock-gated state instead of a power gated state.

At block 375, process 350 issues an I/O request for the I/O operation. Process 350 enters (at block 380) the determined low-power state. In one embodiment, the low-power state is applied to the entire device. In another embodiment, the low-power state is applied to a processor of the device and components related to the processor, such as memory controller and DRAM.

At block 385, process 350 receives a notification that the I/O operation has completed. In one embodiment, the notification is received from the storage device that performs the I/O operation. At block 390, the processor comes out of low-power state to process result of the I/O operation.

One of ordinary skill in the art will recognize that process 350 is a conceptual representation of the operations used to manage system performance. The specific operations of process 350 may not be performed in the exact order shown and described. For example, the operations of blocks 370 can 375 can be performed in parallel or in reverse order. The specific operations may not be performed in one continuous series of operations, and different specific operations may be performed in different embodiments. Furthermore, process 350 could be implemented using several sub-processes, or as part of a larger macro process.

Figure 4:
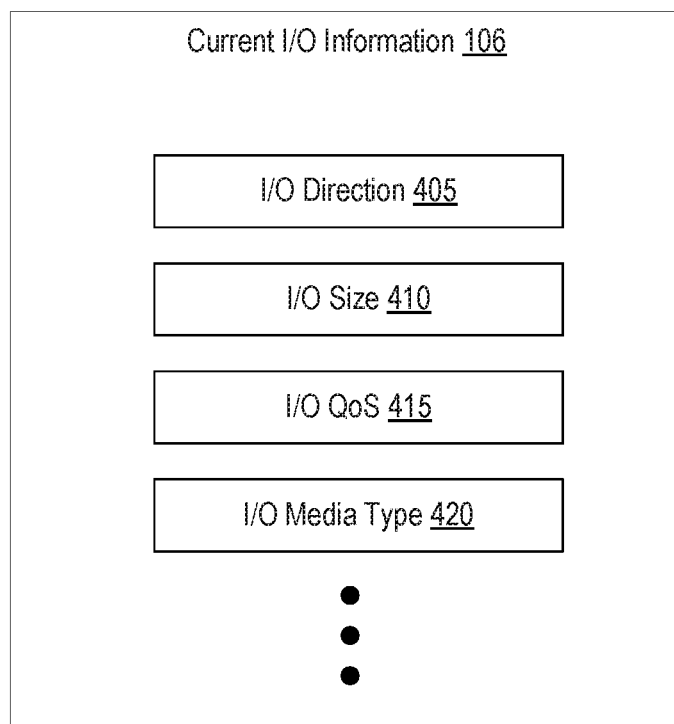
FIG. 4 illustrates an example of current I/O information used in one embodiment.

FIG. 4 illustrates an example of current I/O information used in one embodiment. As illustrated, the current I/O information 106 contains information items that include, but not limited to, I/O direction 405, I/O size 410, I/O QoS 415, and I/O media type 420. In one embodiment, one or more of these information items for the current I/O operation may be used in the determination of an appropriate low-power state in order to reduce power consumption while improving system efficiency and maintaining an acceptable level of system performance.

The I/O direction 405 represents the direction (e.g., read or write) of the I/O operation. In one embodiment, if the I/O operation is a write operation, the current I/O information 106 is ignored in the determination of the low-power state because a write operation may be buffered at the block storage and the processor does not act on the completion of the write operation. In that embodiment, information about a read operation may impact the determination of power state, while information about a write operation does not impact the determination of power state. In one embodiment, a shallower low-power state (i.e., a power state of higher power consumption level and lower latency than it would be without considering the I/O information) will be selected while information about a read operation is received.

A person of ordinary skill in the art will realize that high power consumption level is less than the full operating power level, and low power consumption level is more than completely powering off. A person of ordinary skill in the art will also realize that "high" is relative to "no power" and "low" is relative to "full power".

The I/O size 410 represents the size (e.g., the amount of data involved) of the I/O operation. In one embodiment, a large size I/O operation is given less weight in the determination of the low-power state than a small size I/O operation because a large size I/O operation takes longer time to complete and has less impact on the immediate future of the power state. In contrast, a small size I/O operation is completed quickly, thus has more impact on the immediate future of the power state. In one embodiment, a shallower low-power state (i.e., a power state of higher power consumption level and lower latency) will be selected for a small size I/O operation, while a deeper low-power state (i.e., a power state of lower power consumption level and higher latency) will be selected for a large size I/O operation.

The I/O QoS 415 represents whether the I/O operation is important. In one embodiment, an I/O operation marked with low QoS has little or no impact on the determination of power state. In that embodiment, an I/O operation that marked with high QoS (e.g., a paging operation) has more impact on the determination of power state. For example and in one embodiment, an I/O operation with low QoS can be either filtered out completely or weighted lower in the determination of power state. For example and in one embodiment, an I/O operation with median QoS might be weighted just half as much as an important I/O operation (e.g., from paging) in the determination of power state. For example and in one embodiment, a shallower low-power state (i.e., a power state of higher power consumption level and lower latency) will be selected for a I/O operation with high QoS, while a deeper low-power state (e.g., a power state about half of the power consumption level of the power state for the I/O operation with high QoS) will be selected for an I/O operation with median QoS.

The I/O media type 420 represents the type of media (e.g., solid state drive or hard drive) on which the I/O operation is performed. In one embodiment, an I/O operation performed on a hard drive has less impact on the determination of power state than an I/O operation performed on a solid state drive, because the latency for an I/O operation on hard drive is longer, thus the completion of the I/O operation has less impact on the immediate future of power state. In one embodiment, a shallower low-power state (i.e., a power state of higher power consumption level and lower latency) will be selected for an I/O operation on solid state drive, while a deeper low-power state (i.e., a power state of lower power consumption level and higher latency) will be selected for an I/O operation on a hard drive.

The effect of each information item of the current I/O information 106 to the determination of low-power state has been discussed separately above. However, a person skilled in the art will recognize that two or more information items can be combined to further improve the determination of low-power state. In one embodiment, a low-power state is determined based on the cumulative effect of two or more information items of the current I/O information 106.

Figure 5:
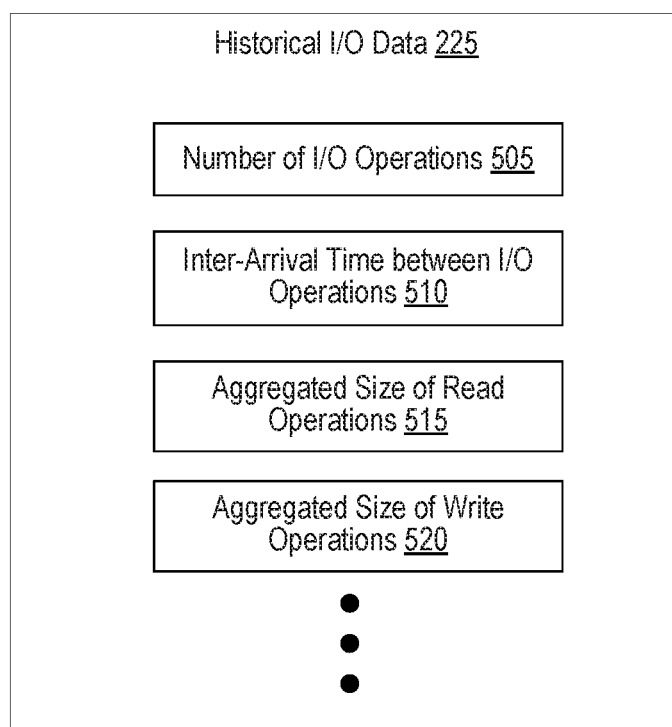
FIG. 5 illustrates an example of historical I/O information used in one embodiment.

FIG. 5 illustrates an example of historical I/O information used in one embodiment. As illustrated, the historical I/O data 225 contains information items that include, but not limited to, the number of I/O operations 505, inter-arrival time between I/O operations 510, aggregated size of read operations 515, and aggregated size of write operations 520. In one embodiment, one or more of these information items for the historical I/O data may be used in the determination of an appropriate low-power state in order to reduce power consumption while improving system efficiency and maintaining an reasonable level of system performance.

The number of I/O operations 505 represents a count of I/O operations during a sample period of time. In one embodiment, a shallower low-power state (i.e., a power state of higher power consumption level and latency) will be selected when the number of I/O operations is high, while a deeper low-power state (i.e., a power state of lower power consumption level and higher latency) will be selected when the number of I/O operations is low. In one embodiment, the higher the number of I/O operations is, the shallower the low-power state will be.

In one embodiment, the inter-arrival time between I/O operations represents the average inter-arrival time between I/O operations during a sample period of time. In one embodiment, a shallower low-power state (i.e., a power state of higher power consumption level and low latency) will be selected if the inter-arrival time between I/O operations is short, while a deeper low-power state (e.g., a power state of lower power consumption level and higher latency) will be selected if the inter-arrival time between I/O operations is long. In one embodiment, the shorter the inter-arrival time between I/O operations is, the shallower the low-power state will be.

The aggregated size of read operations 515 represents the total size of read operations during a sample period of time. In one embodiment, a shallower low-power state (i.e., a power state of higher power consumption level and low latency) will be selected if the aggregated size of read operations is small, while a deeper low-power state (e.g., a power state of lower power consumption level and higher latency) will be selected if the aggregated size of read operations is large. In one embodiment, the smaller the aggregated size of read operations is, the shallower the low-power state will be.

The aggregated size of write operations 520 represents the total size of write operations during a sample period of time. In one embodiment, a shallower low-power state (i.e., a power state of higher power consumption level and lower latency) will be selected if the aggregated size of write operations is small, while a deeper low-power state (e.g., a power state of lower power consumption level and higher latency) will be selected if the aggregated size of write operations is large. In one embodiment, the smaller the aggregated size of write operations is, the shallower the low-power state will be.

The effect of each information item of the historical I/O data 225 to the determination of low-power state has been discussed separately above. However, a person skilled in the art will recognize that two or more information items can be combined to further improve the determination of low-power state. In one embodiment, a low-power state is determined based on the cumulative effect of two or more information items of the historical I/O data 225.

Figure 6:
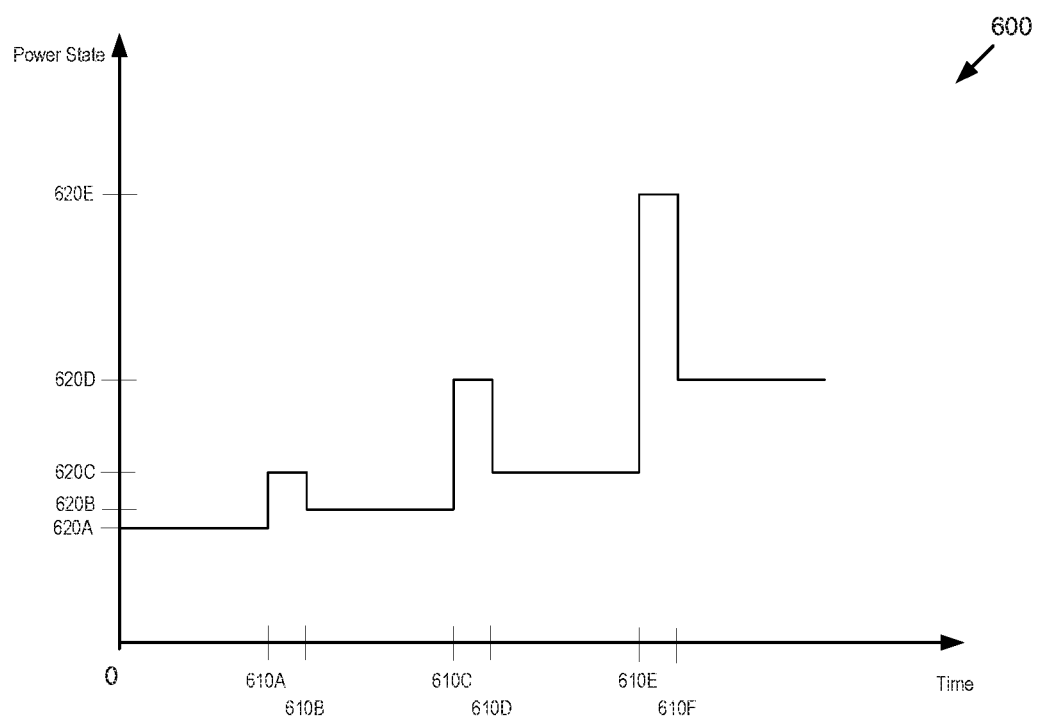
FIG. 6 illustrates an example in one embodiment for adjusting power state based on I/O information.

FIG. 6 illustrates an example in one embodiment for adjusting power state based on I/O information. FIG. 6 identifies several different points of time 610A-F on x-axis of chart 600. Three I/O operations happened during this period of time. The first I/O operation is issued at time 610A and completed at time 610B. The second I/O operation is issued at time 610C and completed at time 610D. The third I/O operation is issued at time 610E and completed at time 610F.

FIG. 6 also identifies several different power states 620A-E on y-axis of chart 600. Latency is the amount of time it takes to go from a low-power state to a higher power state in which the processor can perform certain intended functions. The closer the power state is to the origin of chart 600, the lower power consumption level and higher latency the power state has. The farther away the power state is to the origin of chart 600, the higher power consumption level and lower latency the power state has. For example, power state 620D has a higher power consumption level and lower latency than power states 620A-C.

In one embodiment, the first, second, and third I/O operations are of the same characteristics, e.g. the same size and QoS, etc. In that embodiment, the power state is set at 620A before the first I/O operation is issued. At time 610A, there is no historical I/O information. In one embodiment, no historical I/O information means there is no historical I/O information stored. In another embodiment, no historical I/O information means the older historical I/O information has become stale and is not used for the analysis. In yet another embodiment, no historical I/O information means there are no I/O operations within a time period. At time 610A, the power state is raised to 620B to issue the first I/O operation. At time 610B, the first I/O operation is completed and the power state is dropped to 620B.

At time 610C, there is historical I/O information available with the happening of the first I/O operation and possibly other I/O operations before that time. Because there is I/O historical information available, the power state is raised to 620D at time 610C, which is a bigger raise of power consumption level than at time 610A, to issue the second I/O operation. At time 610D, the second I/O operation is completed and power state is dropped to 620C, which has higher power consumption level and lower latency than power state 620B after the first I/O operation is completed.

At time 610E, more historical I/O information is available with the happening of the first and second I/O operations and possibly other I/O operations before that time. Because there is more I/O historical information available, the power state is raised to 620E at time 610E, which is an even bigger raise of power consumption level than at time 610C, to issue the third I/O operation. At time 610F, the third I/O operation is completed and power state is dropped to 620D, which has even higher power consumption level and lower latency than power state 620C after the second I/O operation is completed.

FIG. 6 shows the accelerated rising of power state when more and more historical I/O information is available. So that a power state with high power consumption level and low latency is maintained to handle I/O operations to reduce power consumption while improving system efficiency and to ensure a reasonable level of system performance.

Figure 7:
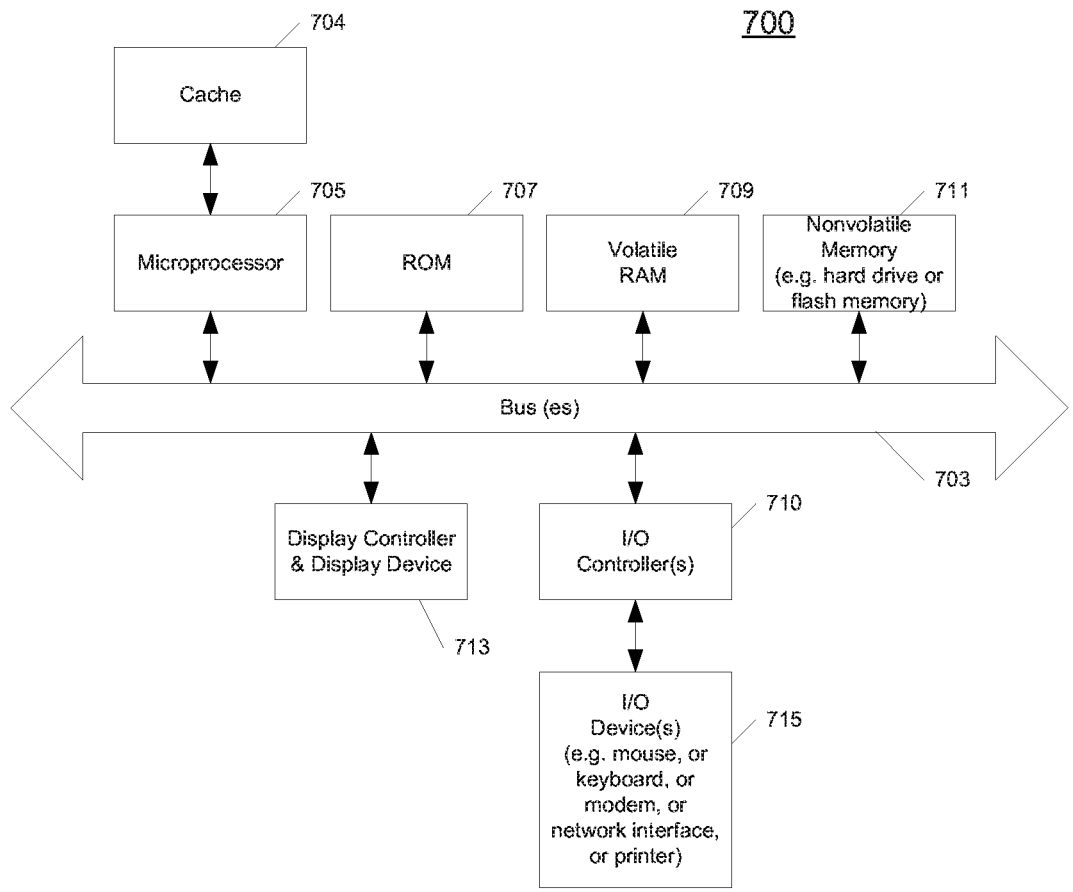
FIG. 7 illustrates one example of a data processing system, which may be used with one embodiment of the present disclosure.

FIG. 7 shows one example of a data processing system 700, which may be used with one embodiment of the present disclosure. For example, the system 700 may be implemented with the device 100 as shown in FIG. 1. Note that while FIG. 7 illustrates various components of a device, it is not intended to represent any particular architecture or manner of interconnecting the components as such details are not germane to the present disclosure. It will also be appreciated that network computers and other data processing systems or other consumer electronic devices, which have fewer components or perhaps more components, may also be used with the present disclosure.

As shown in FIG. 7, the device 700, which is a form of a data processing system, includes a bus 703 which is coupled to a microprocessor(s) 705, a ROM (Read Only Memory) 707, volatile RAM 709, and a non-volatile memory 711. The microprocessor 705 is coupled to cache memory 704. Cache memory 704 may be volatile or non-volatile memory. The microprocessor 705 may retrieve the instructions from the memories 707, 709, 711, and 704, and execute the instructions to perform operations described above. The bus 703 interconnects these various components together and also interconnects these components 705, 707, 709, and 711 to a display controller and display device 713 and to peripheral devices such as input/output (I/O) devices 715, which may be mice, keyboards, modems, network interfaces, printers, and other devices which are well known in the art.

Typically, the input/output devices 715 are coupled to the system through input/output controllers 710. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g., large amounts of data) even after power is removed from the system. Typically, the mass storage 711 will also be a random access memory, although this is not required. While FIG. 7 shows that the mass storage 711 is a local device coupled directly to the rest of the components in the data processing system, it will be appreciated that the present disclosure may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers, and/or adapters as is well known in the art.

Figure 8:
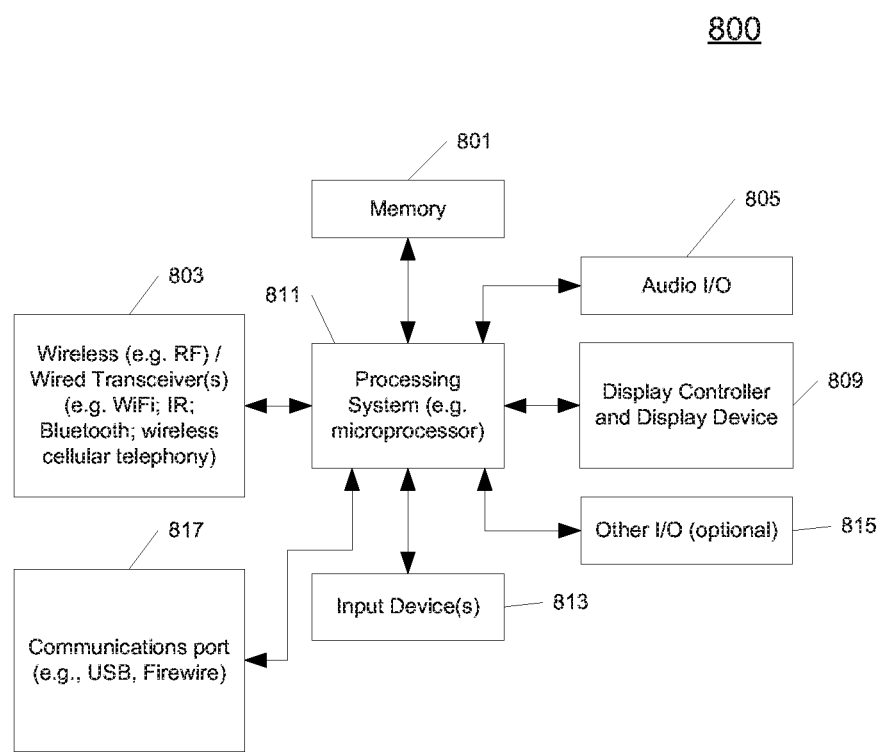
FIG. 8 illustrates one example of another data processing system, which may be used with one embodiment of the present disclosure.

FIG. 8 shows an example of another data processing system 800 which may be used with one embodiment of the present disclosure. For example, system 800 may be implemented as a device 100 as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker, for example, for playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone® when running the iOS operating system, etc. The system 800 also includes one or more wireless transceivers 803 to communicate with another data processing system, such as the system 800 of FIG. 8. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more communication ports 817 to communicate with another data processing system, such as the system in FIG. 10. The communication port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld device or a personal digital assistant (PDA), or a cellular telephone with PDA like functionality, or a handheld device which includes a cellular telephone, or a media player, such as an iPod®, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 8.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. Nos. 7,345,671 and 7,627,343, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding Detailed Descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "selecting," "determining," "collecting," "applying," "entering," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the present disclosure is not described with reference to any particular programming language. It will be appreciated that a variety of programming languages may be used to implement the teachings of the disclosure as described herein.

The foregoing discussion merely describes some exemplary embodiments of the present disclosure. One skilled in the art will readily recognize from such discussion, the accompanying drawings and the claims that various modifications can be made without departing from the spirit and scope of the disclosure.

What is claimed is:

1. A non-transitory machine-readable medium having executable instructions to cause one or more processing units to perform a method to manage performance of a data processing system, the method comprising:
collecting historical input/output (I/O) information about a plurality of I/O operations over a time period with a persistent storage system of an I/O subsystem for the data processing system;
receiving I/O information of a current I/O operation of the data processing system;
in response to the current I/O operation, selecting a reduced power state from one of a plurality of possible reduced power states for a processing core of an integrated circuit of the data processing system, wherein the reduced power state is applied to the processing core when the current I/O operation is being processed by the I/O subsystem of the data processing system, the selecting is based on at least the historical I/O information and the I/O information of the current I/O operation, the I/O information of the current I/O operation includes at least a direction of the I/O operation, wherein the direction of the I/O operation is one of read and write, and, in response to the direction of the I/O operation is write, the current I/O information is ignored in the determining of the reduced power state;

issuing an I/O operation request for the current I/O operation to the I/O subsystem, wherein the processing core is in the reduced power state; and receiving a notification that the current I/O operation has completed, wherein the processing core comes out of the reduced power state.

2. The non-transitory machine-readable medium of claim 1, wherein the method further comprises:

applying the determined reduced power state to the processing core of an integrated circuit of the data processing system.

3. The non-transitory machine-readable medium of claim 1, wherein, in response to the direction of the I/O operation is read, the determining of the reduced power state comprises selecting a power state of high power consumption level and low latency.

4. The non-transitory machine-readable medium of claim 1, wherein the I/O information of the current I/O operation comprises a size of the I/O operation, wherein the size of the I/O operation comprises an amount of data involved in the I/O operation.

5. The non-transitory machine-readable medium of claim 4, wherein the current I/O operation is a first I/O operation and the reduced power state is a first power state, the method further comprising receiving I/O information of a second I/O operation and determining a second power state based on the historical I/O information and the I/O information of the second I/O operation, wherein the size of the first I/O operation is smaller than a size of the second I/O operation, wherein the first power state is determined to have higher power consumption level and lower latency than the second power state.

6. The non-transitory machine-readable medium of claim 1, wherein the I/O information of the current I/O operation comprises a quality of service of the current I/O operation.

7. The non-transitory machine-readable medium of claim 6, wherein the current I/O operation is a first I/O operation and the power state is a first power state, the method further comprising receiving I/O information of a second I/O operation and determining a second power state based on the historical I/O information and the I/O information of the second I/O operation, wherein the quality of service of the first I/O operation is higher than a quality of service of the second I/O operation, wherein the first power state is determined to have higher power consumption level and lower latency than the second power state.

8. A computer implemented method to manage performance of a device, the method comprising:

collecting historical input/output (I/O) information about a plurality of I/O operations over a time period with a persistent storage system of an I/O subsystem for the device;

receiving I/O information of a current I/O operation of the device;

in response to the current I/O operation, selecting a reduced power state from one of a plurality of possible reduced power states for a processing core of an integrated circuit of the device for the processor, wherein the reduced power state is applied to the processing core when the current I/O operation is being processed by the I/O subsystem of the device and the selecting is based on at least the historical I/O information and the I/O information of the current I/O operation, the I/O information of the current I/O operation includes at least a direction of the I/O operation, wherein the direction of the I/O operation is one of read and write, and, in response to the direction of the I/O operation is write, the current I/O information is ignored in the determining of the reduced power state;

issuing an I/O operation request for the current I/O operation to the I/O subsystem, wherein the processing core is in the reduced power state; and receiving a notification that the current I/O operation has completed, wherein the processing core comes out of the reduced power state.

9. The method of claim 8 further comprising entering into the determined reduced power state for the processing core.

10. The method of claim 8, wherein the I/O information of the current I/O operation comprises a size of the current I/O operation, wherein the size of the current I/O operation comprises an amount of data involved in the current I/O operation.

11. The method of claim 8, wherein the I/O information of the current I/O operation comprises a quality of service of the current I/O operation.

12. The method of claim 8, wherein the I/O information of the current I/O operation comprises a media type of the current I/O operation.

13. The method of claim 12, wherein the determining of the reduced power state comprises selecting a power state of higher power consumption level and lower latency in response to the media type of the current I/O operation is solid state drive, and selecting a power state of lower power consumption level and higher latency in response to the media type of the current I/O operation is hard drive.

14. A device for performance management, the device comprising:

a processing core of an integrated circuit;

a memory coupled to the processor though a bus; and a process executed from the memory by the processor causes the processing core to collect historical input/output (I/O) information about a plurality of I/O operations over a time period with a persistent storage system of an I/O subsystem of the device, receive current I/O information of an I/O operation, in response to the current I/O operation, select a reduced power state from one of a plurality of possible reduced power states for the processing core, wherein the reduced power state is applied to the processing core when the current I/O operation is being processed by an I/O subsystem and the selection is based on at least the historical I/O information and the current I/O information, the I/O information of the current I/O operation includes at least a direction of the I/O operation, wherein the direction of the I/O operation is one of read and write, and, in response to the direction of the I/O operation is write, the current I/O information is ignored in the determining of the reduced power state, issue the I/O operation request for the current I/O operation to the I/O subsystem, wherein the processing core is in the reduced power state, receive a notification that the current I/O operation has completed, wherein the processing core comes out of the reduced power state.

15. The device of claim 14, wherein the historical I/O information comprises a number of I/O operations over a sample period of time.

16. The device of claim 15, wherein the determining of the reduced power state comprises selecting a power state of higher power consumption level and lower latency in response to the number of I/O operations is high, and selecting a power state of lower power consumption level and higher latency in response to the number of I/O operations is low.

17. The device of claim 14, wherein the historical I/O information comprises an inter-arrival time between I/O operations over a sample period of time.

18. The device of claim 17, wherein the determining of the reduced power state comprises selecting a power state of higher power consumption level and lower latency in response to the inter-arrival time between I/O operations is short, and selecting a power state of lower power consumption level and higher latency in response to the inter-arrival time between I/O operations is long.

19. The non-transitory machine-readable medium of claim 1, wherein the I/O information of the current I/O operation is a characteristic of the current I/O operation.

20. The non-transitory machine-readable medium of claim 1, wherein the characteristic is selected from the group consisting of direction of the I/O operation, size of the I/O operation, quality of service of the I/O operation, and a media type of the I/O operation.

\* \* \* \* \*